United States Patent [19]
Muskat et al.

[11] 3,862,666
[45] Jan. 28, 1975

[54] SERVO CONTROL SYSTEM FOR FILLING MACHINE WEIGHT SETTING

[75] Inventors: Robert L. Muskat, Glenview; Robert H. Connors, Chicago; King L. Klopfenstein, Prospect Heights; Michael S. Stachnik, Chicago, all of Ill.

[73] Assignee: Triangle Package Machinery Company, Chicago, Ill.

[22] Filed: Nov. 2, 1973

[21] Appl. No.: 412,191

Related U.S. Application Data
[62] Division of Ser. No. 249,506, May 2, 1972.

[52] U.S. Cl................. 177/50, 177/55, 177/80
[51] Int. Cl.. G01g 19/52, G01g 13/24, G01g 13/00
[58] Field of Search.................. 177/50, 55, 58, 80

[56] References Cited
UNITED STATES PATENTS

| | | | |
|---|---|---|---|
| 2,868,375 | 1/1959 | Howard | 177/55 X |
| 3,333,648 | 8/1967 | Dodd | 177/55 |
| 3,484,813 | 12/1969 | Davies | 177/50 |
| 3,620,316 | 11/1971 | Henry et al. | 177/50 |
| 3,681,570 | 8/1972 | Alot | 177/50 UX |

*Primary Examiner*—George H. Miller, Jr.
*Attorney, Agent, or Firm*—Root & O'Keeffe

[57] ABSTRACT

A servo system for controlling the weight of a charge of product dispensed by a filler to a package and for correcting weight variations of the product charge is provided wherein adjustment of the weight setting at the filler takes place after analyzing the weight of a relatively large number of packages, and determining that a predetermined number of packages have a weight which is below (or above) a preselected weight which weight is hereinafter referred to as the "servo reference weight," in relation to a predetermined number of packages which have been weighed. Where a plurality of fillers are used the system also identifies the filler which filled the package being weighed so that the weight setting at the proper filler will be corrected when the selected relationship between the packages filled and those under (or over) the servo reference weight occurs. Where a bag making machine is also involved, the system will also maintain synchronism between the fillers and the checkweigher even though a bag fails to reach the checkweigher at the proper time from a given filler. When the number of packages under (or above) the servo reference weight reaches a selected number deemed to be excessive, then a weight correction will take place immediately regardless of the total number of packages which have been weighed. The weight analysis means will ignore a selected number of packages subsequent to a weight correction to allow a conveyor between the filler and the checkweigher to be cleared.

7 Claims, 5 Drawing Figures

FIG. 1

SERVO REF. WEIGHT
ALSO AVERAGE WEIGHT

FIG. 2

QUANTITY OF PKG. WEIGHTS

MIN. ACCEPTABLE PKG. WEIGHT

SERVO REF. WEIGHT

HEAVIER

SERVO CONTROL SYSTEM FOR FILLING MACHINE WEIGHT SETTING

This is a division, of application Ser. No. 249,506, filed May 2, 1972.

BACKGROUND OF THE INVENTION

It is a well recognized problem in the Packaging Industry that package filling machines even though set to dispense a charge of a given weight will produce packages of varying weights. These variations are the result of the presence of many variables such as product density, atmospheric conditions, physical condition of the filler and the like. If the weights of a number of packages are plotted as the number of packages against the package weight the resulting graph will resemble a probability curve.

There are critical limits in practically all packaging problems from the weight standpoint. For example, Government regulations require that the actual weight of a package must be not less than the weight printed thereon or at least a minimum weight thereunder, and thus the weight of a package which would violate such regulation is a critical limit. Conversely, a critical weight limit could be a weight which anything thereabove would be undesirable, harmful or even dangerous. For example, aerosol containers have critical limits of certain chemicals above which the product might explode, or, in other instances, the addition or presence of certain chemicals in compounds, such as drugs, if in excess of a predetermined amount, could be harmful.

It, therefore, becomes necessary to control the weight of the package by correcting the weight setting at the package filler from time to time in accordance with whether too little or too much product is being dispensed. In some such systems a weight correction signal is originated for every package under or over a preselected weight range, but this unnecessarily changes the weight setting upon the occasional occurrence of weight deviations outside of said range, and thus the setting remains in error until corrected by a servo signal from some subsequent package.

In other instances, systems have operated on the basis of locating the servo reference weight at the center of the probability curve. Such systems operate on the principle that half of the package weights must be less (or more) that the servo reference weight. This is undesirable because, when the curve broadens due to certain conditions at the filler, an excess number of packages will be rejected as below (or above) the critical limit or the minimum (or maximum) acceptable package weight. Likewise, when filler conditions cause the curve to become narrower the average package weight is unnecessarily higher, resulting in too much "give away" of the product.

Again, if a weight correction occurs only at predetermined time intervals or after each predetermined number of packages, then the inefficiency of the system could produce a large number of either rejects or "give aways" unnecessarily.

U.S. Pat. Nos. 3,620,316 and 3,643,752 are examples of problems in this field and of attempts which have been made to solve them.

SUMMARY OF THE INVENTION

In accordance with one of the broader aspects of the present invention, a servo reference weight setting is provided which is located at one or the other side of the mean or average weight of a number of packages as determined by the probability curve. Since the vast majority of package weight problems is concerned with underweight (and thus a probably violation of Government regulations), the description of the invention will relate, in its more specific sense, to package weights which are below the servo reference weight. It will be understood, however, that what is said herein and described as the invention applies equally to the situation where it is undesirable for some reason to have weights in excess of a maximum acceptable weight and wherein the servo reference weight is set near but below said maximum. In the former instance, the invention contemplates the placement of the servo reference weight at some point between the average weight and the minimum acceptable package weight (critical limit). In the latter case, the invention contemplates placement of the servo reference weight between the average weight and the maximum acceptable package weight.

In combination with this the invention further embodies the adjustment of the filler weight setting only after an analysis or a study has been made of a relatively large number of packages. The number of packages analyzed is not critical and may be varied as desired, but, in any event, the invention contemplates the use of computing means or logic means programmed to originate a weight correction signal upon the existence of certain predetermined conditions.

In this connection, the total number of packages being weighed by the checkweigher is counted, and of these packages being counted the number of packages whose weight is below (or above) the servo reference weight is also counted, and this information is fed to computer means. The computer means are programmed to detect certain preselected relationships between the aforesaid first and second counting means, and when any one of such relationships is detected a weight correction signal is sent to adjusting means associated with the filler weight setting, and such weight setting is increased or decreased in accordance with the selected relationship.

While filler weight corrections are normally made only after a consideration of the comparative weights of a relatively large number of packages, nevertheless the invention provides for a weight correction after a relatively small number of packages have been weighed if this small number indicates a trend toward one weight extreme. In such case the logic means will not wait until the larger number of packages has been weighed before a weight correction takes place.

Where multiple fillers are used to fill packages emanating from a single source, i.e., a bag forming, filling and sealing machine, or packages on a conveyor, the invention will identify the filler which filled a package on the checkweigher. In the present instance a stepping means is provided to accomplish this result, which stepping means can be associated with either a continuously cycling checkweigher conveyor or a continuously cycling bag making machine. If the stepping means is associated with the conveyor, then the conveyor becomes the master and controls the stepping means by identifying a particular filler at each cyclic advancement thereof. If the stepping means is associated with a continuously cycling bag making machine then the filler is identified at each cycle of such machine.

Another feature of the invention is the ability to ignore packages in transit from a filler to a checkweigher after the servo system has made a correction. This again prevents overcorrection and the undesirable "hunting and seeking" of a weight correction. Once a correction is made the servo system will ignore packages which have been filled prior to the weight correction until the conveyor is cleared. In the case of multiple fillers this also occurs, but the number of ignored packages will vary. As an example, if there should be 15 package stations on a conveyor between a filler and a checkweigher and there is but a single filler, then at least 15 packages will be ignored by the servo system after a weight correction has been made. If there are two fillers, then the servo system would ignore at least eight of the subsequent packages after a weight correction has been made, and in the case of three fillers, at least five subsequent packages would be ignored.

Where the fillers are used in connection with a bag making machine it may occur that in a given instance a bag may not be released from the machine, in which case the time reserved for that particular bag to reach the checkweigher and be weighed passes without a package having been weighed. Where multiple fillers are involved the above condition causes the system to become out of step and identify a filler other than the one which filled the package then on the checkweigher. The present invention is also directed to the solving of this problem by preventing the servo system from receiving or accepting any information about a predetermined number of succeeding packages placed on the checkweigher following an empty space on the conveyor.

In view of the foregoing the primary object of the present invention is to overcome the disadvantages and undesirable characteristics of servo systems of the prior art as discussed hereinabove and to provide an improved system which will result in the features and benefits above mentioned.

DETAILED DESCRIPTION OF THE PREFERRED EMBODIMENT

Before describing the physical details of the various features of the invention as represented by the logic diagrams, some additional background and explanation of certain considerations should be helpful. As is well recognized when a given number of packages are filled by filler means having in association therewith a predetermined weight setting all packages thus filled will not have the same weight. As mentioned hereinabove, due to varying conditions at the filler, including atmospheric, product density and the like, some of the packages will weigh more than the filler weight setting and others will weigh less. Thus, a probability curve is developed which represents a situation where the more packages being filled the more packages will have a weight close to the filler weight setting. Likewise, all of the packages presumably will fall within a minimum and maximum weight range, although fewer of the packages will have the minimum and maximum weights.

A feature of the present invention is the use of a single servo reference weight setting. The servo reference weight will be close to the minimum acceptable weight so that all packages, the weight of which fall between the servo reference weight and the minimum acceptable weight, will be counted but will not be rejected by the checkweigher. If such weight is below the minimum acceptable weight, then it will be both counted and, at the option of the operator, may be rejected.

One problem always present in connection with requiring minimum weights is an excessive number of rejected packages which would add to the overall packaging costs if they have to be repackaged. Likewise, at the other end of the scale is the problem of too much "give away," i.e. if a system is operating in an area where there are few or no rejects there may be an excessive number of packages containing more than the desired weight, and this situation could likewise prove costly.

Figure 1:
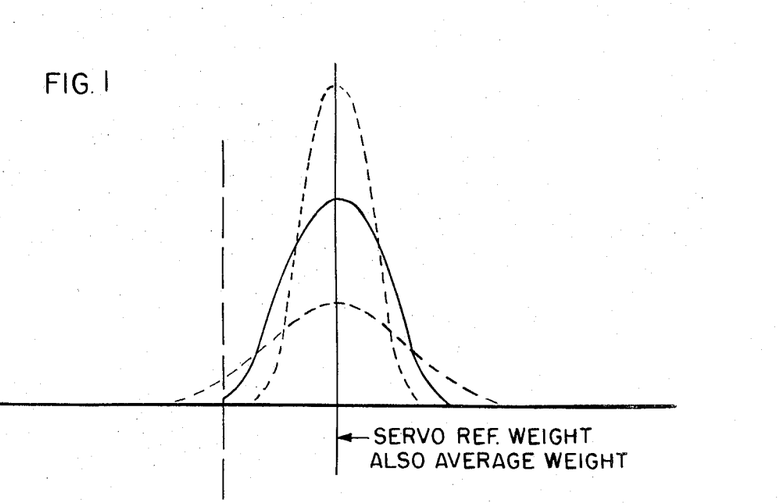
FIG. 1 is a representation of probability curves indicating the servo reference weight as coinciding with the average weight of a number of packages being weighed, and represents an undesirable condition.

It is also recognized that probability curves will vary under varying conditions, and if the servo reference weight setting coincides with the average weight as determined by the probability curve as illustrated in FIG. 1, then there may be excessive give away or excessive rejects. In FIG. 1 the servo operates on the principle that 50 percent of package weights must be less than the servo reference weight. The short term probability curve would be free to broaden or narrow around its center, although the center would remain essentially fixed.

This condition is undesirable as illustrated in FIG. 1 where the numeral 1 indicates in a solid line the supposed or expected probability curve. It will be noted here that the lower end of the curve is at the critical limit or minimum acceptable package weight. When conditions cause this probability curve to narrow as illustrated by the dotted line 2 in FIG. 1, then it is evident that there will be too much give away because the lower limit never reaches the minimum acceptable package weight.

Furthermore, when the curve becomes broader as illustrated by the probability curve 3 shown in dotted lines in FIG. 1 it will be noted that the lower end thereof extends beyond the minimum acceptable package weight, and, therefore, there will be an excess of rejections.

Figure 2:
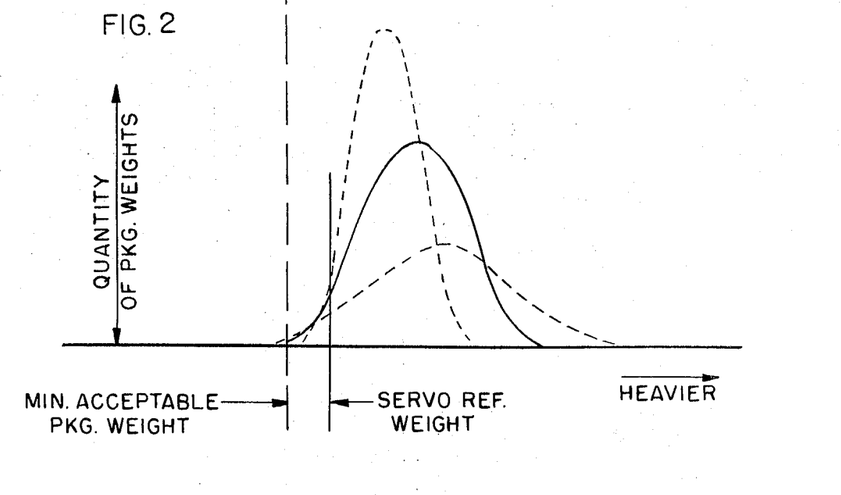
FIG. 2 illustrates probability curves resulting from the use of a servo system embodying the present invention wherein the servo reference weight is below the average weight and relatively near the lower critical limit or minimum acceptable package weight, and is used herein for the purpose of explaining the invention.

The present invention solves this problem by placing the servo reference weight nearer the minimum acceptable package weight. Again it may be mentioned that the same conditions prevail if the concern is overweight, in which case the servo reference weight would be placed on the other side of the average weight line and near the upper critical limit or maximum acceptable weight. This condition is illustrated in FIG. 2 where the probability curve 4 is a solid line and is substantially as before described, and is the curve which would be expected to result from a given number of packages being weighed. The contracted curve shown in dotted lines and identified by the numeral 5 will now move toward the lower weights where there will be less give away and very few packages would be below the critical limit or the minimum acceptable package weight. Thus the reference weight is within the acceptable package weight range so that a tendency toward filler weight error may be detected and servo action taken before package rejection begins. The expanded curve in this instance is illustrated in dotted lines by the numeral 6 where it will be noted that at the lower limit thereof only a very few packages are likely to be below the minimum acceptable weight and, therefore, rejected.

Figure 3:
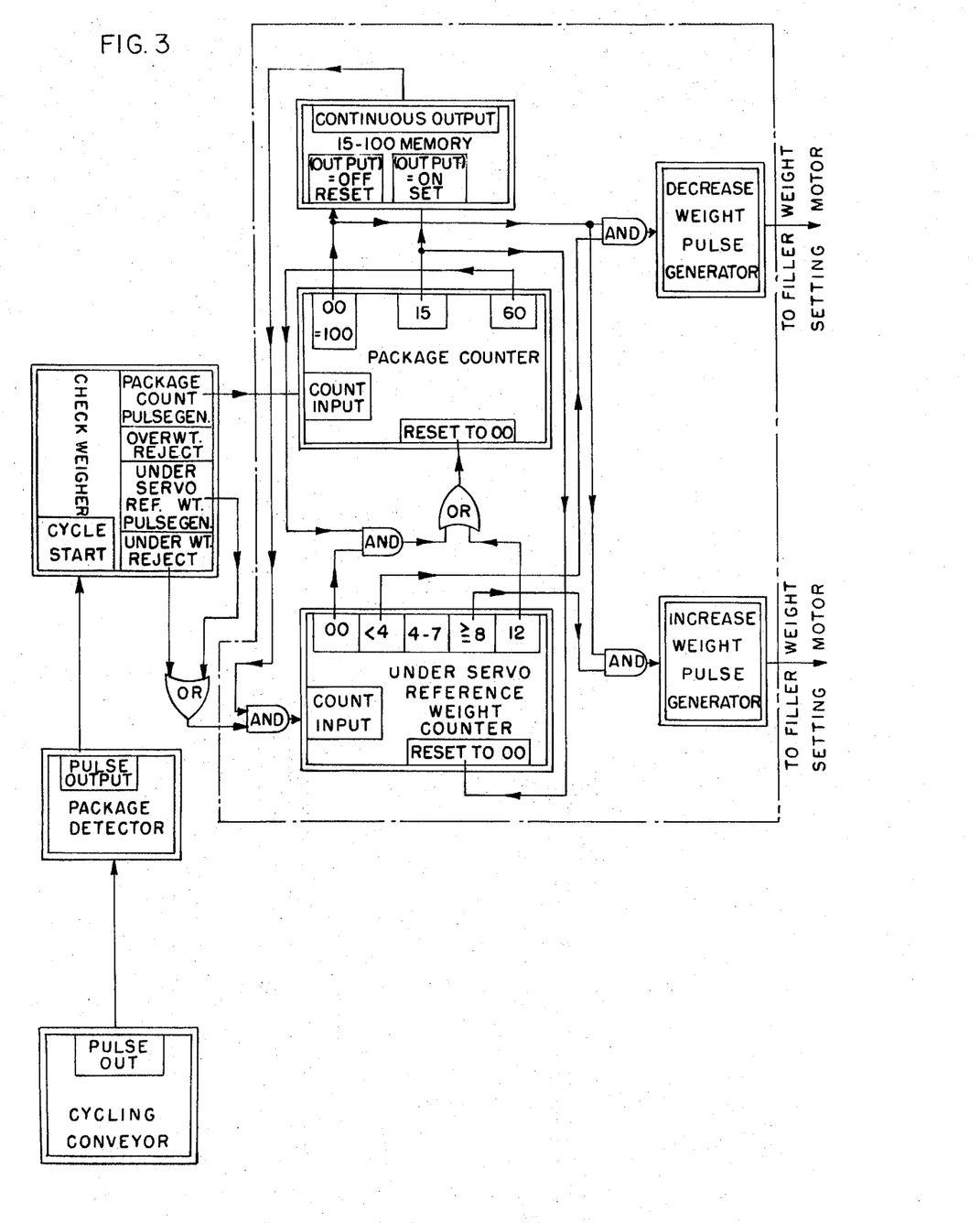
FIG. 3 is a logic diagram of the weight analysis means or programmed computer means for accomplishing certain of the features of the invention.
Figure 4:
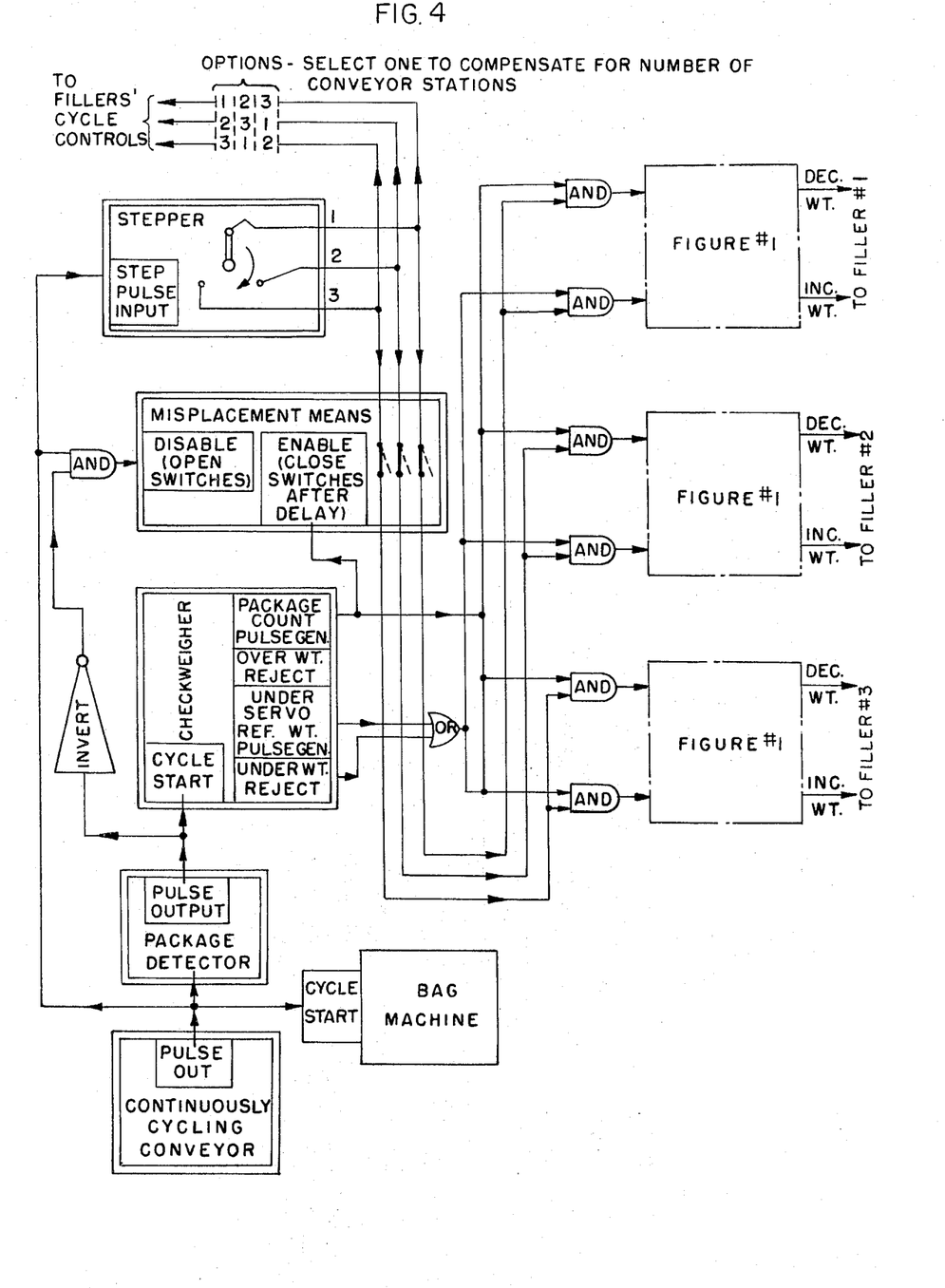
FIG. 4 is a logic diagram of a checkweigher and package weight servo system for three fillers illustrating the manner of accomplishing certain other features of the invention and wherein a continuously cycling conveyor means is the master.
Figure 5:
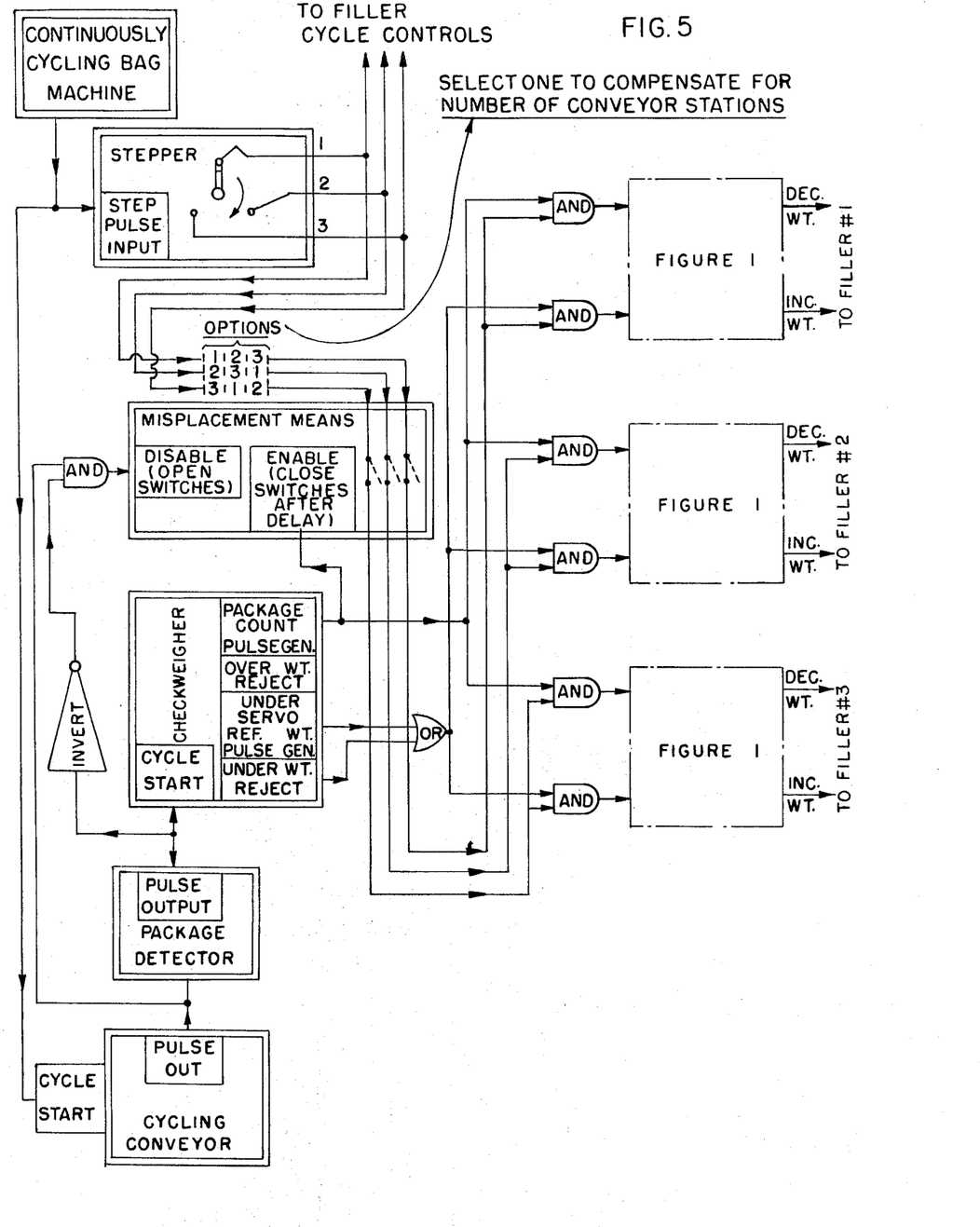
FIG. 5 is a logic diagram similar to FIG. 4 but illustrating the means for accomplishing certain of the features of the invention wherein a bag making machine is the master.

The logic diagrams of FIGS. 3, 4 and 5 illustrate the means by which the objects and features of the invention are accomplished. FIG. 3 represents the conditions for a single filler but it will be understood that this same system will be used in connection with multiple fillers, as will be explained in connection with FIGS. 4 and 5.

The servo control system of the present invention embodies a first counter for counting all of the packages weighed and a second counter for counting all packages under (or over) the servo reference weight. By way of example, only and without any limitation as to the intended weights involved, if it is supposed that the desired weight and weight stamped on the package is 16 ounces and the filler weight setting is placed at 16 ounces, then the servo reference weight would be set at something in excess of 16 ounces but less than the average weight of a given number of packages as determined by the probability curve. This could be, for example, 16⅛ ounces. A package may also have a very small range allowable under 16 ounces without being rejected. For example, 15.95 ounces. Thus, an under servo reference weight signal will be originated at the checkweigher for every package under 16⅛ ounces regardless of whether it is under or over the desired 16 ounces, and such package will be counted by the second counting means as well as the first counting means. If a package is in excess of the 16⅛ ounces it will be counted by the first counting means but not by the second counting means.

Referring now more particularly to FIG. 3, the programmed computer means or logic means for originating the weight correction signals to a motor at the filler which will decrease or increase the filler weight setting is illustrated within the area identified by the dot-dash lines 7. Within this area the first package counter is illustrated generally by the numeral 8 and the second package counter is illustrated generally by the numeral 9.

The checkweigher is indicated generally by the numeral 10, the package detector by the numeral 11 and the cycling conveyor which carries a package from the filler to the check weigher by the numeral 12.

The checkweigher 10 has associated therewith a package count pulse generator 13 which originates a count output received by the count input 14 in the first counting means.

The checkweigher is also provided with the overweight reject 15 (with which we are not here concerned) as well as the underweight reject 16, and the under servo reference weight pulse generator 17.

Also associated with the checkweigher in this logic system is OR gate 18 which receives pulses generated by the under servo reference weight pulse generator 17 and the underweight reject 16. This function is illustrated by the lines 19 and 20 respectively.

Associated with the OR gate 18 is an AND gate 21 which receives signals from the OR gate 18 and conveys them to the count input 22 of the second or under servo reference weight counter 9. The logic line 23 indicates that the AND gate 21 will receive output signals from the under servo reference weight pulse generator 17 whether or not an additional pulse is generated by the fact that a package has been rejected.

The package counter 8 is set and the computer programmed to cause the occurrence of certain happenings when certain predetermined total counts have been recorded which have a predetermined relationship with the counts in the second counter 9. It is to be understood throughout this description that the specific numbers mentioned are intended to be for illustrative purposes only and are not intended in any way to be limitations. For example, the package counter 8 is set to count up to 99 and then resets to 00. This has been selected as a desirable number, but it will be evident that any other numbers above or below this selected number could be used without in any way departing from the spirit of the invention. Thus the counter 8 will register a count from 00 to 99 as indicated by the box 24.

Between the package counter 8 and the second counter 9 there is connected a continuous output means 25 which, during normal operation of the system, continuously provides an enable signal to the AND gate 21. Thus, during operation of the continuous output, whenever a signal is generated by a pulse generator 17 indicating an under servo reference weight package this signal will be received by the count input 22 in the second counter 9. There will be a count range, however, during which the continuous output means will be inoperative, and during the period of this count range no signals from the pulse generator 17 can be received by the second counter 9 because the AND gate 21 requires also a signal from the continuous output.

The purpose of this is to allow the conveyor to be cleared after a weight correction has been made as discussed hereinabove. Here again, however, the distance between a filler and a checkweigher will vary, and the number of package stations on a conveyor between these two points will vary widely depending upon the customer's setup in his plant as well as the type and the quantity of product being dispensed by the filler. The arbitrary number 15 has been selected here purely for illustrative purposes and is not intended in any way to be limiting. Thus, in accordance with the invention, as illustrated by the logic diagram, the first package counter 8 will receive count signals from the generator 13 for every package and will count those packages, but the second counter 9 will have a memory only from 16 to 00. In other words, the continuous output means will be inoperative for the first 15 packages beginning with the count of one, and after the 15th package reaches the checkweigher then the counter 8 will cause a resumption of the operation of the continuous output means 25. This is illustrated diagrammatically in the logic diagram wherein the count of 15 is shown at 26 and a pulse output indicated at 27 to the "on" setting 28 will recommence the continuous output.

In the first package counter 8 there is a second higher predetermined number which will cause the counter to be reset to 00 if that number is reached and no under-servo reference weight packages have been counted, i.e., the second counter 9 remains at 00 count. The reason for this is that when a relatively large number of packages have been weighed and none of them are under the servo reference weight this is an indication that there may be too much give away of product and the weight setting at the filler should be decreased. The number which has been selected herein for illustrative purposes is 60, but again it is to be understood that this is purely arbitrary and any other suitable number could be selected.

In the logic diagram of FIG. 3 the counter 8 is shown as having registered 60 packages in the box indicated by the numeral 29. When the counter 8 reaches this number a pulse output to the AND gate 30 will occur through the line 31. At this time if the second counter 9 registers 00 as indicated at 32 then there is a second output through line 33 to the AND gate 30 which is carried through the OR gate 34 to the reset device 35 in the first counter 8, thereupon resetting the counter 8 to 00. Again the first 15 packages will be ignored by the counter 9 and will not record any of said packages having a weight less than the servo reference weight.

If there have been one or more packages under the servo reference weight counted by the second counter 9, then the count of 60 is meaningless and the count will continue to 00 in the absence of the occurrence of certain emergency measures which will be discussed in greater detail hereinafter. If the number of packages counted reaches 00 and there have been very few packages which are under the servo reference weight, it is desirable at that point to decrease the weight setting at the filler because there may be too much "give away." The number selected to illustrate this point as shown at 36 in the second counter 9 is the number four. In other words, if the total count reaches 00 and there have been less than four packages under the servo reference weight, then a signal will be carried through line 37 to the AND gate 38. Since this AND gate requires another signal before the decrease weight pulse generator 39 can function, nothing will happen except at the count of 00. This may be illustrated by the lines 40 and 41 which are shown as connecting the 00 count box to the AND gate 38. Thus, when the total count reaches 00 and the second counter 9 has recorded less than four (0, 1, 2 or 3) the pulse generator 39 will put out a pulse to the filler weight setting motor which will then be actuated to decrease the weight setting.

It has likewise been determined arbitrarily that if some number in excess of three but below another predetermined number is the count of packages under the servo reference weight when the first counter reaches 00, then this condition is satisfactory, and no adjustment of the weight setting will be made. This number has arbitrarily been determined for illustrative purposes only as being 4, 5, 6 or 7. It will be noted in the lgic diagram of FIG. 3 that, in the second counter 9 there is no connection from the box 42 containing the indication of packages "4–7," to either of the weight pulse generators.

It has further been determined that when the total count reaches 00 and there have been in excess of a predetermined number of packages below the servo reference weight the weight adjustment at the filler should be decreased. For this purpose the arbitrary numbers of 8, 9, 10 and 11 have been selected, and again these numbers are not critical. Thus, from viewing FIG. 3 the box 43 indicating a number equal to or greater than eight is connected by the line 44 to the AND gate 45 indicating that when the package count of the second counter 9 reaches a number equal to or more than eight a signal is put out to the AND gate 45. However, for a signal to reach the increase weight pulse generator 46 the AND gate 45 must also receive another signal, and in this instance the signal will also be through the lines 40, 41 and 47 from the first package counter when the count reaches 00. Thus, when the count reaches 00 and the number of packages under the servo reference weight has reached any one of the numbers 8, 9, 10 or 11 a pulse will be generated to the filler weight setting motor for increasing the filler weight setting.

A fifth condition may also exist which is undesirable, and which should be corrected. That is the condition where the number of packages under the servo reference weight is so great, compared with the total number of packages then weighed, that there is an indication of a trend that an extreme number of packages will be under such weight. In this instance an immediate correction will be made regardless of the total number of packages counted.

Again, the number which has been selected to illustrate this point is purely arbitrary, and is the number 12, as shown in the box 48 in the second counter 9. As shown by the connecting line 49, when the number of under servo reference weight packages reaches 12 an output signal to the OR gate 34 will be transmitted to the reset means 35 to cause immediately the first package counter 8 to be reset to 00. It will be noted from the logic diagram that this will occur at any time the number 12 is reached without regard to the number of packages which have been counted by the first counter 8. Thus the counter 8 is at 00 and a signal is in lines 41 and 47 to AND gate 45; the counter 9 is at 12, and, being in excess of 8 a signal is also present in line 44 to the AND gate 45. Hence a signal will reach the increase weight pulse generator 46.

It should also be mentioned here that after the count reaches the arbitrary number 15, not only will the continuous output signals begin to permit counting of the under servo reference weight packages, but also, through the line 50, a signal will be transmitted to the reset means 51 of the second counter 9 and reset this counter back to 00.

It will be noted that the cycling conveyor, which can be either continuous or intermittent, will create a pulse output for each cyclic advancement thereof to the package detector 11. When the package detector sees a package on the checkweigher it puts out a signal to start the checkweigher cycle. After the packages are filled each one will be counted by the first counter as it reaches the checkweigher, but no packages under the servo reference weight will be counted by the second counter until after the total count reaches 15. However, if the weight of the package is below the critical limit or the minimum acceptable package weight, then it will be rejected at the operator's option regardless of the total count.

It will thus be evident from the foregoing description of the logic diagram of FIG. 3 that we have provided novel servo control means which is highly efficient to provide both a minimum number of rejects and a minimum amount of "give away."

Logic diagrams 4 and 5 illustrate the use of the system of FIG. 3 in connection with a plurality of fillers. Referring especially to FIG. 4, three fillers have been indicated as operating in connection with a bag forming, filling and sealing machine. In FIG. 3 the programmed computer means have been indicated as those means within the dot-dash line 7. In FIG. 4 there are three fillers, and, therefore three of such computer means are indicated as being within the areas bounded by the three dot-dash lines 7.

The three computer means associated with the three fillers are indicated as A, B and C in FIG. 4. Although the fillers are not shown, they are identified as No. 1, No. 2 and No. 3. Filler No. 1 is associated with computer means A. Filler No. 2 is associated with computer means B, and filler No. 3 is associated with computer means C. In this instance, a continuously cycling conveyor 12a is the master and controls the operation of the bag machine, the fillers, the checkweigher, and the operation of an identification means. As indicated above, when a package reaches the checkweigher which is under the servo reference weight it is important that the filler which filled that package be identified. Therefore, we have provided as one of the features of this invention the provision of such identification means.

In FIG. 4 there is the same package detector 11 as heretofore described, together with the checkweigher 10 and its associated elements as shown. In addition thereto, a stepper device 52 is provided which is actuated by the pulse output at each cyclic advancement of the conveyor to advance the stepper and identify the corresponding filler.

Cycling of the conveyor originates a pulse output, at each cyclic advancement thereof, to the package detector 11, to start the cycle of the bag machine 53, and to the stepper 52. This is true whether the conveyor is moving continuously or intermittently, it being understood that the term "cyclic advancement" is intended to means each time the movement of the conveyor advances a package to the checkweigher, or at least advances through that time period whether or not a package is present.

Cyclic advancement of the conveyor then starts the bag machine cycle and energizes the pulse output of the package detector to start the cycle of the checkweigher. Simultaneously the conveyor output pulse will advance the stepper 52 when the pulse reaches the step pulse input thereof through line 54.

The package count pulse generator, as before, will originate a count pulse, but this time it is carried through lines 55 and 56 to all of the AND gates 57, 58 and 59.

If it is assumed that the cyclic advancement of the conveyor has caused the stepper 52 to move the switch 60 thereof to contact 61 as shown in FIG. 4, then the stepper will be electrically connected through lines 62 and 63, through line 64 to the other side of AND gate 57, thereupon actuating the count input 14 of the package counter 8 associated with the filler means No. 1. There being no connections between the stepper and either of the other AND gates 58 or 59, the count input of the counters associated therewith will not be actuated.

At the next cyclic advancement of the conveyor the switch arm 60 will be advanced to contact 65 connected through lines 66, 67 and 68 to the AND gate 58 of the second computer means B, associated with filler No. 2. At the next count pulse, generated when a package is detected on the checkweigher, a signal output will again be transmitted through lines 55 and 56, but this time it will actuate the package counter in the second computer means B by going through the AND gate 58 and will not reach the corresponding counters associated with either of the other computer means A or C because their AND gates are not connected to the stepper at that time.

The next cyclic advancement of the conveyor will move the switch arm 60 to the contact 69 connected through lines 70, 71 and 72 to the AND gate 59 associated with the third computer means C. The detection of another package will again generate an output signal through lines 55 and 56, but this time to AND gate 59 which is already receiving the signal from the stepper.

Thus, at each cyclic advancement of the conveyor the bag machine forms a bag, a previously filled package will be detected and checkweighed, the filler will be identified which filled the package then being weighed, and a filler will be operated.

In addition to the foregoing, when a package is present on the checkweigher that is under the servo reference weight a pulse will be generated, as before, to the OR gate 18. If the underweight is sufficient for a rejection it will be rejected and a pulse will be generated through line 20 to the OR gate 18. With the multiple fillers, however, the OR gate 18 will permit signals from the under servo reference weight pulse generator to be carried through line 73 to the AND gates 74, 75 and 76. As before, the stepper will be connected through the same lines to the respective AND gates 74, 75 and 76 so that, when a package is detected which is under the servo reference weight, the filler identification means will identify the filler which filled the package on the checkweigher. This under servo reference weight package will be counted in the second counter 9 associated with the respective computer means, and when any one of the predetermined relationships between the first and second counter exists in any given computer means, all as previously explained, a weight correction signal will be transmitted to the corresponding filler weight setting motor to either increase or decrease the weight of the subsequent charges.

The phase in which the fillers will sequentially operate will depend upon the number of conveyor stations. With three fillers there are three alternatives for connecting each filler with a particular contact in the stepper. FIG. 4 shows numerically, in vertical columns, various options which can be utilized and selected, depending upon the number of conveyor stations. This group of vertical columns of numbers is indicated generally by the numeral 77.

In an ideal operation the fillers do not miss any cycles, and bags are deposited from the bag machine into the continuously cycling conveyor in consecutive sequence, i.e., a, b, c, a, b, c from fillers No. 1, No. 2 and No. 3 respectively. Many form, fill and seal packaging machines have the property that the first formed bag is not released from the bag machine until a second bag is formed. The present invention can be set up to operate with this type of machine by properly connecting the stepper contacts with the appropriate filler.

It may happen, however, that a filler will fail to dispense a charge, the bag machine will neither form nor release a bag and thus bags will not be deposited on the conveyor in consecutive sequence. As an example, consider the situation where filler No. 2 missed a cycle. In that case bag *a* filled by filler No. 1 would not be released from the bag machine until bag *c* was formed. The bags would then be deposited on the conveyor in the sequence "none, *a c*." In this situation bag *a* now occupies a conveyor space normally reserved for bag *b*, and the conveyor space reserved for bag *a* contains no bag.

To insure continued synchronization between the filler and the respective filled bags or packages formed by the bag machine, the invention provides that the servo system will not accept any information about the package following an empty conveyor space, although this and all following packages will still be accepted or rejected on a weight basis by the checkweigher.

The numeral 78 indicates generally a "misplacement" means whereby to assure continued synchronization and proper relationship between the package on the checkweigher and the filler which filled that package. To do this there is provided in the respective lines 63, 67 and 71 from the steper 52 normally closed switches as indicated at 79, 80 and 81, respectively. As long as these switches are closed the stepper signals will be transmitted to the respective AND gates 57, 58 and 59. When a package is missed, however, these switches will open, whereupon the servo system will not accept information with respect either to the empty space or to the package following the empty space.

This is accomplished by use of the invert means 82 and the AND gate 83.

During normal operation, the pulse from the conveyor is received at one input of AND gate 83, while simultaneously the pulse from the package detector 11 is received both at the checkweigher cycle start and the invert means input. A signal present at the input of the invert means 82 will cause no signal to be present at the output of the invert means, thus a second signal is not present at the second input of AND gate 83. Hence, AND gate 83 does not place a signal into the disable input 84 of misplacement means 78, and switches 79, 80, 81 remain closed.

In the absence of a package, however, the package detector 11 does not generate an output signal to either the checkweigher cycle start or to the invert input. Thus, the invert output does generate a signal, and this signal, combined with the pulse out signal from the conveyor, actuate AND gate 83, which, in turn, places a signal into the input of the disable means 84 of the misplacement means 78 and opens the switches 79, 80, 81. Switches 79, 80, 81 then remain open until after the next subsequent package is checkweighed. A signal from the package count pulse generator 13 activates, through line 85, the input of the enable means 86 of the misplacement means 76. After a built-in delay, switches 79, 80, 81 then reclose.

With respect to FIG. 5, this illustrates the logic diagram when the bag machine rather than the conveyor is the master. Otherwise all operations as described above remain the same. In this case, however, the bag machine is indicated as 53*a* and is continuously cycling. The bag machine cycle controls the operation of the conveyor, the fillers, the checkweigher and the identification means.

Each cycle of the bag machine 53*a* puts out a signal to the stepper 52 through line 87 to advance the switch arm 60 to the next contact. There will also be a pulse output from the bag machine to start the cycle of the conveyor 12*a*, and the operation from this point on is the same as that described above, namely, the output pulse from the conveyor enables the package detector to put out a pulse if there is a package present and will start the checkweigher cycle. If there is no package, then the signal from the output of the invert means will combine, within AND gate 83, with the pulse-out signal from the conveyor 12*a*, and the output signal of AND gate 83 will cause the misplacement means to open the switches, and the servo system will not accept information about the package following the empty conveyor space.

From the foregoing description it will be evident that we have provided improved novel means whereby to achieve the objects as aforesaid and to overcome the undesirable characteristics and shortcomings of heretofore known servo control systems for filling machine weight settings.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

We claim:

1. A package filling and identification system comprising:
   a. a plurality of fillers each adapted to dispense a charge of product to fill a package,
   b. checkweighing means for the packages,
   c. conveying means for delivering packages from said fillers to said checkweighing means, and
   d. filler identification means including a stepper device responsive to each advancement of the conveyor, whether or not a package has been delivered to and is being weighed by the checkweighing means, to identify each said filler to maintain synchronization between the filler and the package then being checkweighed.

2. A servo control system for a package filling machine weight setting comprising:
   a. a plurality of fillers operable in sequence to dispense a charge of product to fill a package in accordance with a predetermined weight setting associated with each filler,
   b. adjusting means associated with the weight setting of each said filler for adjusting the weight setting associated therewith,
   c. checkweighing means for the packages,
   d. a conveyor for delivering packages during each cyclic advancement thereof from said fillers to said checkweighing means,
   e. filler identification means responsive to each said cyclic advancement of the conveyor to identify each said filler,
   f. weight analysis means associated with each said filler, including weight correction feedback means to originate a package weight correction signal and actuate the adjusting means of its corresponding filler, and g. means responsive to both said checkweighing means and said identification means to originate at least one count pulse to the weight analysis means of the filler coresponding to the package being weighed to maintain an accumulative count for each filler, whereby, upon the existence of certain predetermined conditions in each said weight analysis means, weight adjustment of the proper filler will be assured.

3. In a cycling bag forming, filling and sealing machine, a servo control system for the filler weight setting, comprising:
 a. a plurality of fillers operable in sequence to dispense a charge of product to fill a bag in accordance with a predetermined weight setting associated with each said filler,
 b. adjusting means associated with the weight setting of each said filler for adjusting the weight setting associated therewith,
 c. checkweighing means having a cycle synchronized with a bag machine cycle and adapted to weigh successive bags in accordance with each bag machine cycle and to put out information concerning each package weighed,
 d. filler identification means responsive to each cycle of the bag forming machine to identify the filler used for filling the package being checkweighed,
 e. weight correction feedback means operable in response to information received from said identification means and said checkweighing means to originate a package weight correction signal and actuate one of said adjusting means upon the occurrence of any one of certain predetermined conditions, and
 f. means to prevent said weight correction feedback means from receiving the information output from said identification means and said checkweighing means whenever checkweighing does not occur during one of the checkweighing cycling times due to failure of the bag machine to deliver a bag to said checkweighing means, and to continue to prevent receipt of said information output for at least one additional checkweighing cycling time.

4. In a cycling bag forming, filling and sealng machine, a servo control system for the filler weight setting comprising:
 a. a plurality of fillers operable in sequence to dispense a charge of product to fill a package in accordance with a predetermined weight setting associated with each filler,
 b. adjusting means associated with the weight setting of each said filler for adjusting the weight setting associated therewith,
 c. checkweighing means for the packages,
 d. a conveyor means for delivering packages, during each cyclic advancement thereof, from said fillers to said checkweighing means,
 e. said checkweighing means having a cycle synchronized with the cyclic advancement of said conveyor means and adapted to weigh successive bags in accordance with each cyclic advancement of said conveyor means,
 f. filler identification means responsive to each cyclic advancement of said conveyor means to identify the filler used for filling the package being checkweighed,
 g. weight correction feedback means operable in response to information received from said identification means and said checkweighing means to originate a package weight correction signal and actuate one of said adjusting means upon the occurrence of any one of certain predetermined conditions, and
 h. means to prevent said weight correction feedback means from receiving the information output from said identification means and said checkweighing means whenever checkweighing does not occur during one of the checkweighing cycling times due to failure to deliver a bag to said checkweighing means during a previous cyclic advancement thereof, and to continue to prevent receipt of said information output for at least one additional checkweighing cycling time.

5. A package filling and identification system comprising:
 a. a first cycling means consisting of a plurality of fillers each adapted to dispense a charge of product to fill a package,
 b. checkweighing means for the packages,
 c. a second cycling means consisting of conveying means for delivering packages from said fillers to said checkweighing means, and
 d. filler identification means including a stepper device responsive to each cycle of one of said cycling means, whether or not a package has been delivered to and is being weighed by the checkweighing means, to identify each said filler to maintain synchronization between the filler and the package then being checkweighed.

6. A package filling and identification system comprising:
 a. a plurality of fillers each adapted to dispense a charge of product to fill a package,
 b. cycling conveying and checkweighing means for the packages,
 c. means for delivering packages from said fillers to said conveying and checkweighing means, and
 d. filler identification means including a stepper device responsive to each cycling of the conveying and checkweighing means, whether or not a package has been delivered thereto and is being weighed by the checkweighing means, to identify each said filler to maintain synchronization between the filler and the package then being checkweighed.

7. In a cycling bag forming, filling and sealing machine, a servo control system for the filler weight setting comprising:
 a. a plurality of fillers operable in sequence to dispense a charge of product to fill a package in accordance with a predetermined weight setting associated with each filler,
 b. adjusting means associated with the weight setting of each said filler for adjusting the weight setting associated therewith,
 c. checkweighing means for the packages,
 d. a conveyor means for delivering packages, during each cyclic advancement thereof, from said fillers to said checkweighing means,
 e. said checkweighing means having a cycle synchronized with the cyclic advancement of said conveyor means and adapted to weigh successive bags in accordance with each cyclic advancement of said conveyor means, f. filler identification means responsive to each cycling of the bag forming, filling and sealing machine to identify the filler used for filling the package being checkweighed, g. weight correction feedback means operable in response to information received from said identification means and said checkweighing means to originate a package weight correction signal and actuate one of said adjusting means upon the occurrence of any one of certain predetermined conditions, and h. means to prevent said weight correction feedback means for receiving the information output from said identification means and said checkweighing means whenever checkweighing does not occur during one of the checkweighing cycling times due to failure to deliver a bag to said conveyor means during a previous cyclic advancement thereof, and to continue to prevent receipt of said information output for at least one additional checkweighing cycling time.

* * * * *

PO-1050
(5/69)

UNITED STATES PATENT OFFICE
CERTIFICATE OF CORRECTION

Patent No. 3,862,666  Dated January 28, 1975

Inventor(s) Robert L. Muskat et al.

It is certified that error appears in the above-identified patent and that said Letters Patent are hereby corrected as shown below:

In the "REFERENCES CITED", Patent No. 3,681,570 the inventor's name "Alot" should be "Abt".

In the "ABSTRACT" Line 22 "above" should be --over--.

Col. 7 Line 67 "lgic" should be --logic--.

Col. 13 Line 6 "coresponding" should be --corresponding--.

Col. 14 Line 15 "checkweighing" should be --conveyor--.

Col. 16 Line 3 "for" should be --from--.

Signed and Sealed this thirtieth Day of September 1975

[SEAL]

Attest:

RUTH C. MASON
Attesting Officer

C. MARSHALL DANN
Commissioner of Patents and Trademarks